May 6, 1969  R. F. ROBINSON  3,442,662
FOOD PACKAGE CONTAINING SIMULATED BACON-TYPE FOOD PRODUCTS
Original Filed May 27, 1963
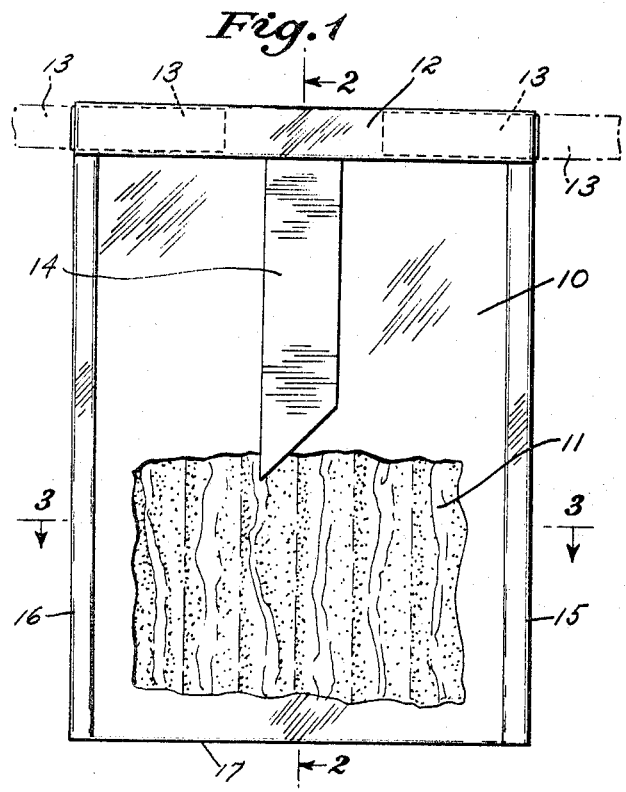
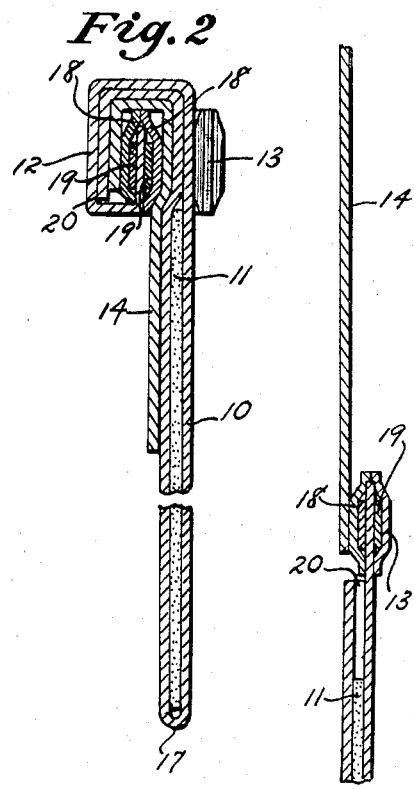
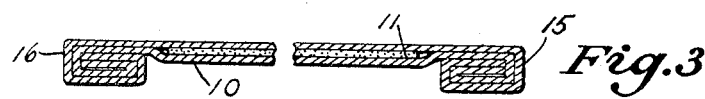
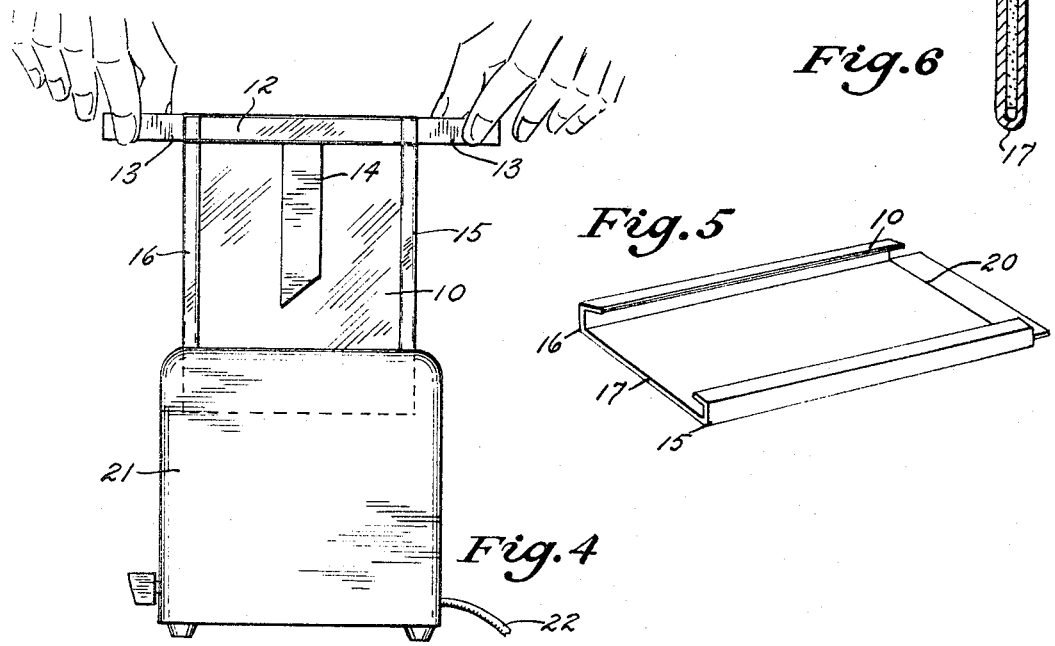

United States Patent Office 3,442,662
Patented May 6, 1969

3,442,662
FOOD PACKAGE CONTAINING SIMULATED BACON-TYPE FOOD PRODUCTS
Radcliffe Franklin Robinson, Highland Park, N.J., assignor of Colgate-Palmolive Company, New York, N.Y., a corporation of Delaware
Continuation of application Ser. No. 283,451, May 27, 1963. This application June 22, 1965, Ser. No. 472,383
Int. Cl. B65b 25/06
U.S. Cl. 99—171      5 Claims

ABSTRACT OF THE DISCLOSURE

Hermetically sealed heatable food package containing simulated bacon, prepared from molecularly-oriented man-made fibers of natural vegetable protein and having a moisture content of from 5% to 9%, the dimensions of the package being such as to permit ready insertion into a slot of a bread toaster.

---

This application is a continuation of application Ser. No. 283,451, filed May 27, 1963, now abandoned.

This invention relates to food products and more particularly, to a heatable, precooked food package containing meat-like bodies of proteinaceous plant protein, and to a method for preparing such package.

The preparation of meat-like products from proteinaceous plant protein is well known. For example, a previously proposed process for the manufacture of such products comprises preparing a quantity of filaments of protein material by dispersing protein material, such as soybean protein, in a suitable dispersing medium wherein the protein is solubilized, forcing the dispersion through a spinneret similar to those used in the production of textiles, and passing the streamlet obtained thereby into a coagulatory bath which is generally an acid salt solution. The streamlets coming through the spinneret are thus precipitated in the form of filaments. The diameter of the filaments can very depending on the orifice sizes of the spinneret. One spinneret can produce several thousand filaments which then can be grouped together to form a group of filaments. If a battery of spinnerets are employed, a considerable number of these "bundles" of filaments are formed, which when assembled, constitute what is known in the art, as a "tow" of filaments. In order to convert the filaments which have been produced into a meat product, it has also been proposed that the filaments be initially freed from excess salt solution and then treated with edible binders, and that various types of meat be simulated by passing the proteinaceously bound filaments through a bath of melted fat, either as single bundles or as a "tow," or by extending a ribbon of fat through the tow. Thus, the final piece of synthetic meat is the proteinaceously bound tow, treated with the desired fat.

According to this invention, a heatable, sealed, precooked food package comprises a previously cooked predetermined number of substantially dehydrated meat-like bodies of vegetable protein containing meat-like flavoring, sealingly confined in a heat-conductive encasing material.

The meat-like bodies of this invention may represent a wide variety of simulated meat products. However, the present invention is primarily directed to strip-shaped, and preferably bacon-shaped slices which have the appearance, taste (when cooked to the same degree as the natural product), and texture of the natural meat product. The meat-like bodies are preferably substantially fat-free, are of low caloric count and high nutritive value. However, it is to be understood that the meat-like bodies may contain fat in any desired proportion.

More particularly, the invention is preferably directed to a novel metal foil encased package of precooked bacon-shaped slices of molecularly-oriented man-made fibers of natural vegetable protein held together by means of an edible binder, said package and enclosed slices having dimensions such that they may be inserted into a slot of an automatic toaster for quick automatically-controlled heating to the desired serving tempertaure, and to a novel method of preparing such packages.

The novel food package of this invention can be prepared by forming a meat-like body, in the form of a ribbon, slab or the like, but preferably in the form of a slice, from vegetable protein, preferably from man-made molecularly-oriented fibers of natural protein held together by means of an edible binder, incorporating a meat-like flavoring in said body, dehydrating the body, preferably by subjecting the same to a moving air current and sealingly confining said body in a heat-conductive material.

As indicated above, the meat-like bodies encased in the heat-conductive material may represent a wide variety of food compositions, ranging from slices, strips, ribbons, slabs and the like of simulated corned beef, pastrami, ham and the like, to possible meat-like novelty products containing a wide variety of colors wherein the simulated non-lean portion can represent a portion colored in a manner which does not suggest lean meat. These meat-like bodies may be substantially fat-free or may contain fat in any desired proportion. However, it is preferable in the practice of this invention that the zones simulating both the fat portions of natural meat, as well as the zones simulating the lean portion thereof, comprise the bound (preferably proteinaceously) man-made vegetable protein fibers. Various additives (including fat) may also be incorporated in disseminated form, in any desired proportion that does not deleteriously affect to a substantial degree the properties of the product. The meat-like products usually are of relatively low-caloric count and are of high nutritive value and have substantially the same texture, taste and advantageously the appearance of an identifiable natural meat product.

The preferred strip-shaped (hereinafter usually referred to, for convenience, as bacon-like) slices can be produced from a ribbon of proteinaceously bound man-made protein fibers cut into desired lengths and colored to simulate the texture and appearance of a natural bacon slice. However, the bacon-like slices can also be produced from a slab prepared by heat-setting a mass of proteinaceously bound molecularly-oriented man-made vegetable protein fibers, to which bacon flavoring has been added, transversely slicing the slab and subsequently coloring the slices obtained therefrom to simulate the desired appearance.

The slices obtained either from the ribbon or from the single-layered slab can be colored in a wide variety of ways. For example, zones thereof can be colored by mechanical or normal means to simulate the lean portions of the meat, or more preferably a color stamping device can be employed for this purpose which will "stamp" the slices to imprint the desired coloration thereon.

However, a particularly preferred method in the practice of this invention of producing the individual bacon-like slices having substantially the same coloring and appearance as well as the taste, chewiness and texture of natural bacon slices, is to slice transversely a multi-layered bacon-like slab precursor. This slab is prepared by forming an initial layer of molecularly-oriented man-made fibers of natural vegetable protein held together by means of an edible binder, then forming at least one other layer in like manner and placing the same on said initial layer, incorporating a meat-like flavoring material to at least one and desirably to a plurality of layers, coloring at least one but not all of said layers with food coloring agents to impart the color of the lean portion of natural bacon thereto, and heat-setting the plurality of layers to form a slab having the appearance of natural bacon, i.e., having the appearance of lean portions and fat-like portions.

A critical feature of the slab composed of a plurality of alternatively disposed layers is that it is transversely sliceable such that the slices obtained have the substantial coloring and appearance, as well as the taste, chewiness and texture of natural bacon slices without requiring an additional step of either stamping or coloring (zones of the slices) in order to simulate the desired appearance.

It is to be noted that in the case of the package containing a bacon-like product made from proteinaceously bound man-made fibers of vegetable protein, the same binder can be employed for both the simulated lean and non-lean portions, although as will be described hereinafter, some variance in the type of binder can be effected to simulate further the difference between the lean and non-lean portions of natural bacon, even as to texture and chewiness as well as to taste and appearance. However, for quantity production it is generally preferable to employ the same binder for both the lean and non-lean portions of the bacon-like product and to define the portions purely as a function of coloring.

It is to be noted that because of the unique coloring feature of the preferred slab precursor, the slices cut therefrom will closely resemble the corresponding natural product. Moreover, the simulated bacon slices obtained from multilayered slab precursor are superior to the colored slices obtained from other intermediate products in degree of toughness, i.e., these slices are less tough; in chewines, i.e., the slices have more of the chewiness of slices of the natural product; and in general overall meat-like quality. In all instances (from any intermediate product) the slices obtained need not be fried or broiled for maximum tastiness and palatability though such can be done if desired. Indeed, it is a particular advantage of the products of this invention that they are more preservable if they are not fried because they will meet the most preferential criteria of this invention, i.e., of being relatively and preferably substantially fat-free. By "relative fat-free" is meant relatively fat-free with respect to the amount of fat contained in the natural product which the product of this invention simulates. It should be again noted, however, that the fat content of the food product of this invention can be adjusted to any desired level. A food product such as a bacon-like product containing less than 22% fat can be considered, relatively speaking, to be substantially fat-free.

The taste of the bacon slices obtained from any of the above intermediate products can be further enhanced if either the multilayered heat-set slab, the single-layer heat-set slab, or the ribbon precursor product or the individual slices cut therefrom are smoked. In this regard, it has been found that smoking the individual slices is more advantageous than smoking the intermediate bulk products per se. Smoking will also enhance the natural appearance of the product.

The man-made fibers preferably employed to form the meat-like bodies can be produced by the previously proposed procedure described above. In the slab precursor these fibers are preferably disposed randomly in at least substantially unoriented fashion in each layer thereof. For optimum taste, chewiness, texture and appearance, the man-made fibers initially employed in forming the layers should range from not less than about ¼" to not more than about 5" in length.

However, the fiber lengths are but one of the many variables which are of importance in obtaining an optimum product. Other variables include the percentage of the fibers (tow) in the overall product, the amount and type of binder, the percentage of moisture in the tow and final product, the pH of the tow and final product, the amount and type of flavoring additives used, and the process conditions employed in making the product.

The amount of tow employed in producing the simulated meat-like bodies, will depend on the type of product desired but generally will reside in the range of from about 25 to 70% by weight. However, it has been determined that amounts of tow in the range of 30 to 50% by weight of the food product of this invention are preferable. The tow should also preferably be made of spun soybean fibers though it is within the scope of this invention to employ fibers spun from other vegetable or non-meat proteins such as peanut, casein, sesame seed, corn and cottonseed meal protein.

The choice of a suitable binder for the simulated bacon product made from vegetable fibers is also of great importance. While a bacon-like product can be obtained using a wide variety of known binders selected from among cereal and non-cereal type proteinaceous material, as well as from starches, dextrins and the like, it has been found that for proper firmness at least part of the binder should comprise egg albumin. However, for optimum results, it has been found that a binder comprising a combination of albumin and a neutralized soya protein (about pH 7.0) is most desirable. Of the latter soya type proteins, isolated soya proteinates and in particular alkali metal and alkaline earth metal soya proteinates, e.g., sodium, potassium, calcium soya proteinates, are particularly useful.

The aforesaid albumin and soya sodium proteinate binder has been found to be most preferable in imparting the desired firmness and crispiness to the finished product. If the soya protein binder is used alone, it is to be understood that a bacon-like product can be obtained but it will be relatively soft and lack the exact texture, chewiness and firmness of bacon. On the other hand, the use of an albumin binder alone will impart to the bacon-like product many of the qualities of natural bacon but the end product will lack the desired crispiness of the natural product. When the combined albumin and soybean binders are employed together, however, these disadvantages noted when each of these ingredients are used alone, are surprisingly overcome.

The amount of binder employed in the simulated bacon slices will vary, of course, depending on the type of binder used. For example, with respect to the multilayered precursor, it has been found that the percentage range of binder to the overall slab product should range from about 30% to about 60% by weight. In this regard, the term "binder" denotes the weight of the solid matter, e.g., albumin and soy protein, and the water employed therewith. However, as indicated previously, the type of binder very often determines the amount useful in forming the inventive product. For example, if albumin is employed solely as the binder, the effective amount thereof will vary widely depending on the degree of firmness desired in the bacon product. In this regard, an effective amount can comprise as low as 4% by weight. On the other hand, the maximum amount would be determined purely by considerations of practicality and may be 30 percent or more. However, if a relatively soft food product is desired, a neutralized alkali metal soya proteinate may be employed in the range of about 15 to 30% by weight of the overall product.

It can also be seen that the texture and firmness of the multilayered slab precursor can be varied, layer by layer, by varying the amount and type of binder. Thus, for example, a desirable bacon slice can be obtained from a slab wherein the simulated lean portion comprises a relatively high percentage of albumin binder while the simulated non-lean portion comprises a lower amount of albumin binder and a larger amount, relatively speaking, of a soy protein binder. For example, the lean layers could contain a binder having an albumin to soya proteinate ratio of between 10:1 and 3:2, while the non-lean layers could contain a binder having an albumin to soya proteinate ratio of between 1:1 and 1:3.

It is also to be understood that the concentration of the binder employed is another variable. For example, the preferred aqueous dispersion of albumin and soya protein binder employed in the practice of this invention can have an effective concentration of from about 6 to about 30% by weight, with 15–18% being most preferred.

The multilayered slab precursor should preferably have a pH in the range of about 5.8 to about 6.2. In this regard, in the washing of the tow preparatory to cutting the latter in the fiber lengths which are preferred in the practice of this invention, a pH of about 4 to about 7 has been found to be useful.

As indicated previously, bacon-like or meat-like flavoring components are known in the food art. In the practice of this invention, any suitable flavor additives can be employed. However, a particularly preferred bacon flavoring component has been found to comprise a combination of autolyzed and hydrolyzed yeast extracts, monosodium glutamate and smoked yeasts, such as Torula yeast, along with amounts of salt, spices and vegetable extracts, as well as hydrolyzed vegetable proteins. Naturally, the amount of the flavoring ingredients will vary widely depending upon individual taste preferances.

A wide choice of known food coloring additives can be employed, a combination of FDC #2, FDC #4, plus caramel coloring, having been found to be most desirable in obtaining the desired lean coloring.

The mixing of the binder with the fibers preparatory to forming the layers is an important step in the preferred process of forming the slab precursor of the preferred bacon-like slices of this invention. A complete mixing should preferably be effected in order to obtain the preferably disoriented mass of fibers and binding materials. Before mixing, the tow should be initially cut to the desired length, i.e., such that the fibers mixed with the binder have lengths of between ¼" and 5". It should be again noted that while the "binder" is mixed with the cut fibers of the tow to form the layers, in the preferred method of forming the slab, the flavoring and coloring (if desired) components previously discussed are also added therewith in the mixing step.

Following the mixing step and the preparation of the layers, the uncooked slab thus formed should then be heated to obtain a vertically or transversely sliceable slab. The internal temperature which the slab should attain should range between about 160° F. and about 200° F. with a temperature of between 165° F. and 175° F. being preferable. Within this range, the product will "set up" in the manner desired and will not be either too soft, too hard, or too brittle. The term "set up" defines the formation of a congealed identifiable mass as the result of the application of heat thereto. Any acceptable heating medium can be employed. In this regard, standard hot air ovens are useful but microwave ovens can also be employed. If microwave cooking is used to prepare the finished product, the time of cooking can be greatly diminished.

Following cooking, the slab can then be smoked until the desired color is imparted thereto. As indicated previously, smoking enhances the taste and appearance of the product. It also, moreover, increases the shelf life thereof. If desired, the individual slices can be separately smoked. If this procedure is followed, the smoking time can be shortened appreciably and the individual bacon-like slices will have an improved appearance and taste. The individual slices can be further cooked by infrared means to obtain the desired crispiness.

A critical feature of the subject invention is that the moisture content of the meat-like body should be adjusted prior to being encased in the heat-conductive material. In this regard, the moisture adjustment can be carried out in any suitable manner. However, it has been found preferable to effect this adjustment by subjecting the meat-like bodies to the flow of air. The airflow can be provided by convection currents caused by heating in a confined area, such as a hot air furnace or, even more preferably by passing a flow of air at ambient temperature over the surface of the meat-like product.

The moisture adjustment step is of importance because it guarantees excellent keeping properties to the treated food items without use of canning or freezing techniques. It also aids in the conservation of the taste and flavor of the meat-like product. Moreover, in the case of the bacon-like product, air dehydration results in a corresponding bacon-like product having the consistency of crisp bacon. Primarily, however, the adjustment of the water content of the bacon-like product results in a product having substantially longer storage or shelf life without refrigeration.

As indicated previously, the air-flow process can be effected by a moving stream of air at ambient temperature or by the application of heat whereby convection currents are produced. In this latter regard, temperatures of up to about 500° F. can be employed to provide these convection currents. Lower (below room temperature) or higher temperatures can be employed if desired but no commensurate advantage is gained thereby.

The percentage of moisture remaining in the product after adjustment is of considerable importance particularly for the bacon-like slice product of this invention. In this regard, the food bodies encased in the heat-conductive material should preferably contain moisture in the range of between 5 and 9% by weight. It has been found that a moisture content in the bacon-like slices of below about 5% adversely affects the fat stability of the product, i.e. rancidity proceeds more rapidly. Higher moisture content (above 9% by weight) results in a greater possibility of adverse bacterial or microbiological growth.

The meat-like bodies and preferably the precooked bacon-like slices can be sealingly packaged in a heat-conductive casing in any suitable manner known to the art. However, it is preferably in the practice of this invention to employ as the casing, a metal foil and particularly an aluminum foil. While the package can be of any shape suitable for confining a particular food product, it is preferred in the practice of this invention to employ an envelope-type packet containing bacon-like slices therein of suitable dimensions such that the entire packet can be inserted into an electric toaster for the heating of food to a serving temperature.

In accordance with this preferred method of carrying out the present invention, therefore, dehydrated strips of the synthetic bacon-like product prepared as indicated heretofore are packaged in an aluminum foil envelope. The bacon-like slices may be overlapped therein if desired. However, it is to be noted that the degree of overlapping will determine the thickness of the bacon slices. This may be of criticality where the package is intended for insertion into the bread-slots of an automatic toaster. The increased area of the foil provides a section which does not get overheated so that the package can be opened while the product is still hot. The top section of the package can be isolated from the heating portion of the package by appropriate insulation, if desired. For this purpose any suitable manner of insulation, such as heat and/or electrically non-conductive tabs, handles and the like, can be attached to the upper portion of the package.

The package should be hermetically sealed so that moisture content of the synthetic bacon-like product remains constant and the product remains crisp. This packaged product can then be stored at ambient temperatures and does not require freezing or refrigeraton. The purchaser when ready to use the bacon inserts the package into an automatic electric toaster (or other suitable heating means such as hot-air ovens and the like) and sets the temperature control at an indicated or desired temperature for heating the product. When the package is ejected by the toaster mechanism, the meat-like product, i.e., the bacon-like slices, is ready-to-serve.

The fact that the package of this invention need not be frozen or refrigerated is of decided importance. Where refrigeration of a package of this nature is required, it may be necessary to place the package through two or more heating cycles merely to raise the temperature of the product to room temperature, following which further heating is necessary to raise the temperature to normal eating temperature. By providing a package storable at room temperatures, these additional heating cycles may be eliminated.

In lieu of or in addition to the feature of insulating the top section of the package from the heating portion of the package, an additional feature which can be incorporated into the inventive food package is that of applying an electrically insulating layer to the heat-conductive casing of the package. Such a layer can be applied by a wide variety of methods which includes anodizing the casing, coating the package with an electrically insulating varnish, coating the package with a ceramic coating such as water glass, or applying a silicone or other organic electrically insulating polymer which is heat curable to the surface of the coating. In the latter case, the silicone or other organic polymer can be heat-cured prior to application on the package material, or can be cured in situ, to impart the non-conductive qualities to the surface of the package.

In addition, if desired, the electrically insulating or non-conductive coating materials, or the casing per se, can be impregnated with a suitable pigment such as titanium oxide and the like, to impart a decorative effect to the package. Such a pigment, however, can also have utilitarian features beyond decoration. The pigment containing coating can also be utilized to control the absorption or reflection of the heat provided by the toaster (etc.) thereby regulating the final temperature of the food product within the pack.

The ability of metallic coatings, with or without pigments, to reflect heat is of importance since many toasters employ a thermo-heat detector to determine the length of time which a food product should remain within the toaster. The use of non-reflective surfaces in the vicinity of such detectors will diminish the possibility of the packet being ejected too rapidly from a toaster, so that the residence time therein will not be too short. If a black coating is used on the toaster pack in the area of these thermo-heat detectors, the residence time of the food in the toaster will be sufficiently long for the food to be heated.

Insulating coatings can be applied to the surface of the packet by any suitable means such as spraying, and the like. In the case of anodizing, i.e., imparting a metal oxide layer to the surface of the envelope, electro-chemical treatments useful for such purpose can be employed.

If desired, it is to be noted that flavoring or odor ingredients can be included as a separate entity along with the food product confined within the sealed package. These may, if desired, be of the type which volatilize during storage or are volatilized by the heat provided by the toaster or oven, thereby increasing the flavor or odor of the product or disseminating an odor into the room if the product is being heated in an open pack.

The following drawing relates to a package containing bacon-like slices which has been found to be particularly useful in the practice of this invention.

In the drawing:

FIG. 1 is a plan view of a package ready for heating in a toaster;

FIG. 2 is a sectional view along the line 2—2 of FIG. 1;

FIG. 3 is a sectional view along the line 3—3 of FIG. 1;

FIG. 4 illustrates a package according to this invention being inserted in an automatic electrical toaster;

FIG. 5 is a side elevational view of another type packet illustrating an envelope configuration;

FIG. 6 is a sectional view along the line 3—3 of FIG. 1 showing the package in an open state.

Referring to FIG. 1, bacon-like slices 11 of proteinaceously bound man-made fibers of vegetable protein are inserted in an aluminum foil envelope 10 having overlapped hermetically sealed edges 15 and 16 and single edge 17. The aluminum foil envelope 10 is approximately 6 inches long and 4 inches wide. The bacon slices 11 are approximately 4½ inches long, 1½ inches wide and 0.05 inch thick. The upper edge 12 comprises a series of successive folds which are pressure sealed. An electrically non-conductive tab 13 shown in non-extended (folded back) form is disposed along said upper edge 12. An electrically non-conductive pull tab 14, said tab having a pressure sensitive adhesive underside, is disposed along the face of the aluminum foil envelope 10, the upper portion of said tab 14 being confined beneath the pressure sealed edge 12. In operation, the electrically non-conductive pull tab 14 is pulled in a trajectory substantially perpendicular to the linear plane of the envelope 10 whereby said multi-folded edge 12 is unfolded and said package is opened, thereby permitting the removal of the bacon-like slices 11 therefrom.

FIG. 2 is a sectional view along line 2—2 of FIG. 1. In this representation, the bacon-like slices 11 are shown confined in the aluminum foil envelope 10. The pull tab 14 is disposed along the outer face of the envelope 10 and is indicated as being confined beneath the folded layers of the upper edge 12 of the envelope 10. The sectional view of the tab 13 further indicates the outer cover 18 of (one of) said tabs 13 enclosing therein the stiffener 19 for said tab 13. The space 20 is defined above the bacon strips 11.

FIG. 3 is a sectional view along line 3—3 of FIG. 1. In this figure the overlapped sealed edges 16 and 15 are defined in relation to the aluminum foil 10 enclosing the bacon-like slices 11.

In FIG. 4, the tabs 13 are shown in extended position preparatory to inserting the envelope 10 into the toaster 21, said toaster being connected to a suitable electrical outlet by cord 22.

FIG. 6 is another sectional view along line 2—2 of FIG. 1 and illustrates the package represented by FIG. 1 and FIG. 4 after removal from the toaster wherein the pull tab 14 has been pulled up thus exposing the bacon slices 11 represented beneath the space 20.

The aluminum foil employed in the package depicted above is inert, non-corrodible, substantially moisture-proof and light-proof and is moreover an excellent heat conductor. The foil is unaffected by the 350° F. to 450° F. temperatures normally employed in automatic electrical toasters.

The following examples will further illustrate the scope of this invention. Unless otherwise indicated, the parts and percentages employed therein are by weight. It is to be understood that these examples are purely illustrative and are not to be considered in any way as a limitation on the scope of the subject invention.

EXAMPLE I (a) Preparation of bacon-like slices

A bacon-like slab product was prepared from the following relative proportions of ingredients:

| | Percent |
|---|---|
| Protein tow-(spun and stretched soybean protein fibers—¾–5″ in length—containing 60% moisture and a pH of 5.9) | 33.26 |
| Neutralized soya sodium proteinate binder | 5.85 |
| Albumin | 3.51 |
| Autolyzed and hydrolyzed yeast extract (with salt, spices and vegetable extract (celery and onion) added) | 3.42 |
| Monosodium glutamate | 1.03 |
| Smoked torula yeast (with hydrolyzed vegetable protein and salt added) | 1.68 |
| Vegetable gum stabilizer | 0.07 |
| Corn oil | 12.26 |
| FDC Red #2 (red coloring) | 0.09 |
| FDC Red #4 (red coloring) | 0.23 |
| Caramel | 0.09 |
| Water | 38.50 |

Water, red coloring, soybean proteinate binder, albumin, autolyzed and hydrolyzed yeast extract, monosodium glutamate, smoked Torula yeast and vegetable gum stabilizer are mixed in the proportions indicated above at room temperature. The vegetable gum stabilizer employed is a guar gum. However, it can also be a seaweed extract or locust bean gum and the like. The corn oil is then added thereto and this combination is then mixed for about 3 to 7 additional minutes. Spun and stretched soybean protein fibers in the indicated proportion cut in lengths of from ¾″ to 5″ are then added to this mixture and a complete mixing in an aluminum foil encased tray 14″ by 16″ in size, is carried out, whereby the fibers or bundles thereof are dispersed in random and unoriented fashion in the initial binder-containing mixture. After thoroughly mixing the ingredients to form a mass having a dough-like consistency, a roller is employed to level out the ingredients to form a red layer.

In like manner, a second layer is formed without, however, the addition of red coloring material. This white layer is then placed on top of the initial red layer.

In like manner, a further red layer is then formed, followed by another white layer until a slab of about 1½″ in height is obtained, each layer averaging about ⅜ inch in thickness. The red and white layered slab is then placed in an oven and heated to a temperature of about 165° F. for about seventy minutes to set the slab, the temperature representing that noted in the center of the slab. At the end of the heating period, a sliceable, cooked, bacon-like slab is obtained having substantially the appearnace and product identity of a natural bacon slab. Following this heating, the slab is sliced and the individual slices are smoked in a smoking chamber until the desired simulated appearance of smoked bacon slices is effected.

(b) *Moisture adjustment*

Several slices of the simulated bacon-like product obtained as a result of the process described in (a) above, are placed in a vacuum oven and are kept there for 4 hours at 60° C., whereby the moisture content of the slices is reduced to below about 9 percent. The dimensions of the slices are 4½ inches by 1½ inches, by 0.05 inch thick, and the fat content thereof is less than about 22 percent. The slices have a bacon-like crispiness, taste and texture.

(c) *Packaging*

Four (4) slices obtained as a result of the process described in (b) above, are placed in an aluminum foil envelope having the dimensions 4 inches by 6 inches. The slices are placed side by side in the envelope and the latter is heat-sealed. After storing at room temperature for approximately 2 months, the foil envelope is placed in an automatic toaster. After completion of the toasting cycle, the envelope is torn open and the bacon-like slices are removed and are found to have excellent flavor, and to be crisp and ready to eat.

EXAMPLE II (a) *Preparation of bacon-like slices*

Another bacon product was prepared from ingredients in the following proportions:

| | Percent |
|---|---|
| Sesame seed protein fibers, 58% moisture | 25.00 |
| Soya sodium proteinate | 2.00 |
| Albumin | 9.40 |
| Autolyzed and hydrolyzed yeast extract | 3.00 |
| Monosodium glutamate | 1.00 |
| Smoked Torula yeast | 1.00 |
| Guar gum | .09 |
| Corn oil | 10.00 |
| Water | 48.50 |

Water, soybean proteinate binder, albumin, autolyzed and hydrolyzed yeast extract, monosodium glutamate, smoked Torula yeast and guar gum stabilizer are mixed in the proportions indicated above at room temperature. Corn oil is then added thereto and this combination is then mixed for five minutes. Spun and stretched sesame seed protein fibers in the indicated proportion, cut in lengths of about one inch are then added to this mixture and a complete mixing in an aluminum foil encased tray 14″ by 16″ in size is carried out, whereby the fibers are dispersed in the initial binder-containing mixture. After thoroughly mixing the ingredients to form a mass having a dough-like consistency, a roller is employed to level out the ingredients to form a single-layered mass of about 1½ inches in height.

The mass is then cooked as previously described in Example I to form a slab of about 1½ inches in height, 18 inches in length and 14 inches in width. The slab is then cut to desired slice lengths and individual slices are then cut therefrom. These slices are then subjected to a color-stamping press whereby the color of bacon is imprinted on each of said slices. The slices are then smoked in a smoking chamber until the desired simulated appearance of smoked bacon slices is obtained.

(b) *Moisture adjustment*

Slices of the simulated bacon-like product obtained as a result of a process described in 2(a) above, are placed in a stainless steel mesh rack in a chamber exposed to forced air circulation at ambient temperature. After 9 hours the moisture of the bacon product is about 5%.

(c) *Packaging*

Eight (8) slices of the dehydrated, simulated bacon having dimensions of 4.5 inches long by 1.5 inches wide velope, evenly distributed in overlapped position. The enveolpe, evenly distributed in overlapped position. The envelope is then sealed and aged overnight. The sealed envelope is then heated in an automatic toaster. After heating the envelope is torn open. The products are found to possess excellent flavor, are suitably crisp, and are ready to eat.

It is to be understood that the methods of moisture adjustment can be varied. Thus, for example, slices of varying thickness e.g. 0.035 inch, 0.050 inch, 0.060 inch, 0.075 inch and 0.100 inch can be subjected to heating in a Capri-Roto-Broil (at a setting of No. 5) at a temperature of between 250° F. and 350° F. for a period of between 5 and 11 minutes to effect the desired moisture adjustment. Optionally, the slices can also be placed under an infrared lamp or can be subjected to the flow of a stream of nitrogen. Following either of these latter methods a satisfactory adjustment can be effected, though air-drying is preferred in the practice of this invention.

It is to be understood that the invention is not limited to the specific embodiments described above. Various modifications can be made in the inventive products and in the process of making the same without departing from the spirit or scope of the invention.

I claim:

1. A heatable, sealed, precooked food package comprising a previously cooked predetermined number of coherent, elongated slices of molecularly-oriented manmade fibers of natural vegetable protein held together by means of a proteinaceous binder, said slices containing synthetic bacon flavoring and having areas simulating in appearance the fat portion of natural bacon and other areas simulating in appearance the lean portion of natural bacon, said slices having a moisture content of between about 5 and about 9%, and said slices being confined in a hermetically sealed metal foil envelope, whereby said package is storable at room temperature conditions, and said envelope having dimensions corresponding substantially to those of a slice of bread and being relatively thin for insertion into the bread slice slot of an automatic toaster for automatic heating of the package and its contents by said toaster.

2. A package according to claim 1, in which the foil has a heat-reflective surface.

3. A heatable, sealed, precooked food package in accordance with claim 1 wherein said elongated slices comprise smoked slices of molecularly oriented man-made fibers of natural vegetable protein, and wherein said proteinaceous binder comprises an aqueous dispersion of albumin and a member selected from the group consisting of alkali metal and alkaline earth metal soya proteinate, and wherein said metal foil envelope comprises aluminum having a heat-reflective surface.

4. A heatable, sealed, precooked food package in accordance with claim 1 having a fat content of less than about 22%.

5. A heatable, sealed, precooked food package in accordance with claim 3 having a fat content of less than about 22%.

References Cited

UNITED STATES PATENTS

| | | | |
|---|---|---|---|
| 2,807,550 | 9/1957 | Zarotschenzeff et al. | 99—174 |
| 2,830,902 | 4/1958 | Anson et al. | 99—14 |
| 2,952,543 | 9/1960 | Szczesniak et al. | 99—17 |
| 3,102,031 | 8/1963 | MacAllister et al. | 99—17 |
| 3,177,079 | 4/1965 | Kuramoto et al. | 99—17 |

A. LOUIS MONACELL, *Primary Examiner.*

H. H. KLARE III, *Assistant Examiner.*

U.S. Cl. X.R.

99—174